(12) United States Patent
Marathe et al.

(10) Patent No.: US 8,572,338 B1
(45) Date of Patent: Oct. 29, 2013

(54) SYSTEMS AND METHODS FOR CREATING SPACE-SAVING SNAPSHOTS

(75) Inventors: Shailesh Vaman Marathe, Maharashtra (IN); Niranjan Pendharkar, NCL (IN)

(73) Assignee: Symantec Corporation, Mountain View, CA (US)

( * ) Notice: Subject to any disclaimer, the term of this patent is extended or adjusted under 35 U.S.C. 154(b) by 217 days.

(21) Appl. No.: 12/709,995

(22) Filed: Feb. 22, 2010

(51) Int. Cl.
*G06F 12/00* (2006.01)
*G06F 13/00* (2006.01)
*G06F 13/28* (2006.01)

(52) U.S. Cl.
USPC ......................................................... 711/162

(58) Field of Classification Search
USPC ......................................................... 711/162
See application file for complete search history.

(56) References Cited

U.S. PATENT DOCUMENTS

| | | | |
|---|---|---|---|
| 7,373,366 B1 * | 5/2008 | Chatterjee et al. ..................... 1/1 |
| 7,395,378 B1 * | 7/2008 | Pendharkar et al. .......... 711/144 |
| 7,631,156 B2 * | 12/2009 | Nakamura et al. ............. 711/161 |
| 2007/0156957 A1 * | 7/2007 | MacHardy et al. ........... 711/114 |
| 2009/0204650 A1 * | 8/2009 | Wong et al. .................... 707/204 |

* cited by examiner

*Primary Examiner* — Matthew Bradley
*Assistant Examiner* — Craig Goldschmidt
(74) *Attorney, Agent, or Firm* — ALG Intellectual Property, LLC

(57) ABSTRACT

A computer-implemented method for creating space-saving snapshots may include: 1) identifying a parent volume on which to perform a snapshot, 2) allocating at least one thin-provisioned volume for the snapshot, 3) identifying an attempt to write to a region of the parent volume, and then 4) copying the region to the thin-provisioned volume. Various other methods, systems, and computer-readable media are also disclosed.

18 Claims, 8 Drawing Sheets

SYSTEMS AND METHODS FOR CREATING SPACE-SAVING SNAPSHOTS

BACKGROUND

Organizations increasingly generate and use large amounts of data. In the course of managing its data, an organization may wish to back up this data while maintaining uninterrupted access to the same.

A consistent backup may require that all data within a backup reflect the state of the backed-up data at a given point in time. In order to provide a consistent backup of a volume of data (as well as uninterrupted access to write to the volume), a backup system may utilize a space-saving snapshot. Traditional technologies may create a space-saving snapshot of a volume by making a copy of a block of data on the volume whenever that block of data is about to be overwritten. Attempts to read from the snapshot may then be either directly fulfilled from the volume (if the corresponding block on the volume has not changed since the snapshot) or fulfilled from a copied block of data created for the snapshot.

In order to locate copied blocks of data when fulfilling read requests for a snapshot, traditional technologies may maintain a map that identifies the location where each copied block of data is stored. Unfortunately, maintaining such a map may degrade system performance. For example, maintaining a persistent snapshot block location map may increase the I/O load of a system. Additionally, if a cluster of systems require access to the snapshot, then synchronizing the map across various nodes within the cluster may increase I/O latency and network traffic. Accordingly, the instant disclosure identifies a need for efficiently creating space-saving snapshots.

SUMMARY

As will be described in greater detail below, the instant disclosure generally relates to systems and methods for creating space-saving snapshots by storing blocks of data copied for space-saving snapshots on thin-provisioned volumes (e.g., without maintaining a dynamic map of snapshot block locations). In one example, one or more of the various systems described herein may accomplish this task by: 1) identifying a parent volume on which to perform a snapshot, 2) allocating at least one thin-provisioned volume for the snapshot, 3) identifying an attempt to write to a region of the parent volume, and then 4) copying the region to the thin-provisioned volume.

Allocating the thin-provisioned volume for the snapshot (e.g., from a storage array) may include: 1) selecting a storage tier and then 2) allocating the thin-provisioned volume from the storage tier. Selecting the storage tier may include a variety of approaches. In some examples, selecting the storage tier may include selecting a low storage tier. Additionally or alternatively, selecting the storage tier may include selecting a user-specified storage tier.

Copying the region to the thin-provisioned volume may include copying the region to an equivalent address on the thin-provisioned volume. In some examples, the methods and systems described herein may also pre-allocate space for the region on the thin-provisioned volume before copying the region to the thin-provisioned volume. Pre-allocating space for the region may include a variety of approaches. For example, pre-allocating space for the region may include sending a request through an interface for the thin-provisioned volume to pre-allocate space for the region. Additionally or alternatively, pre-allocating space for the region may include issuing a dummy write attempt to an address of the thin-provisioned volume that is equivalent to an address of the region.

In some examples, the systems and methods described herein may also fulfill a read attempt of the region. For example, systems of the instant disclosure may: 1) identify an attempt to read the region from the snapshot, 2) determine that the region has not changed since the snapshot, and then 3) fulfill the read attempt from the parent volume. In another example, systems of the instant disclosure may: 1) identify an attempt to read the region from the snapshot, 2) determine that the region has changed since the snapshot, and then 3) fulfill the read attempt from the thin-provisioned volume.

Determining that the region has changed since the snapshot may involve a variety of approaches. For example, determining that the region has changed since the snapshot may include: 1) marking the region as changed in a tracking structure after copying the region to the thin-provisioned volume and then 2) checking the tracking structure to determine that the region has changed. Additionally or alternatively, determining that the region has changed since the snapshot may include determining that the space for the region has been allocated to the thin-provisioned volume. Determining that the space for the region has been allocated to the thin-provisioned volume may include determining that space for an address of the thin-provisioned volume that is equivalent to an address for the region has been allocated.

As will be explained below, by storing blocks of data copied for space-saving snapshots on thin-provisioned volumes, the systems and methods described herein may statically map the location of the snapshot blocks between their original location on a parent volume and a thin-provisioned volume. As such, the systems and methods described herein may reduce the I/O load on a system that may otherwise maintain persistent dynamic snapshot block location maps. Additionally, if a cluster of systems require access to the snapshot, the systems and methods described herein may eliminate the need to synchronize a snapshot block location map across various nodes within the cluster, potentially reducing I/O latency and/or network traffic.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
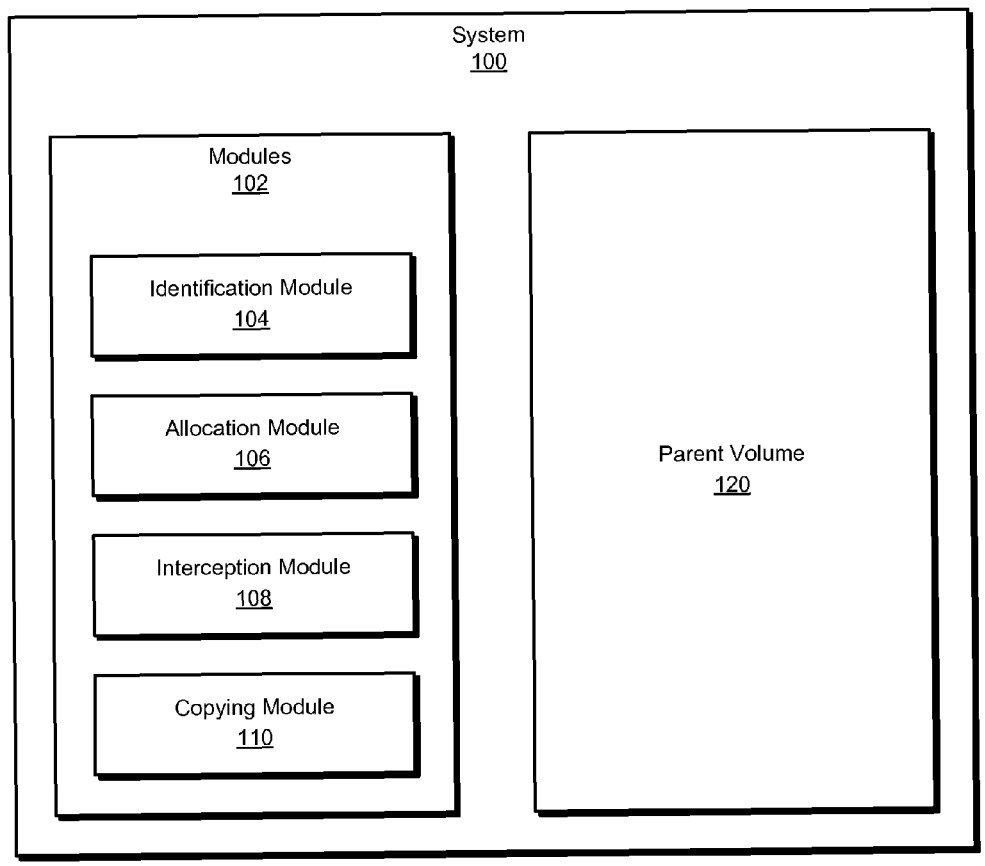
FIG. 1 is a block diagram of an exemplary system for creating space-saving snapshots.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for creating space-saving snapshots. In one example, one or more of the various systems described herein may accomplish this task by: 1) identifying a parent volume on which to perform a snapshot, 2) allocating at least one thin-provisioned volume for the snapshot, 3) identifying an attempt to write to a region of the parent volume, and then 4) copying the region to the thin-provisioned volume.

The following will provide, with reference to FIGS. 1-2 and 4-5, detailed descriptions of exemplary systems for creating space-saving snapshots. Detailed descriptions of corresponding computer-implemented methods will also be provided in connection with FIGS. 3 and 6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for creating space-saving snapshots. As illustrated in this figure, exemplary system 100 may include one or more modules 102 for performing one or more tasks. For example, and as will be explained in greater detail below, exemplary system 100 may include an identification module 104 programmed to identify a parent volume on which to perform a snapshot. Exemplary system 100 may also include an allocation module 106 programmed to allocate at least one thin-provisioned volume for the snapshot. Exemplary system 100 may also include an interception module 108 programmed to identify an attempt to write to a region of the parent volume.

In addition, and as will be described in greater detail below, exemplary system 100 may include a copying module 110 programmed to copy the region to the thin-provisioned volume. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing system 202 and/or storage array 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include a parent volume 120. Parent volume 120 may represent portions of a single volume or computing device or a plurality of volumes or computing devices. For example, parent volume 120 may represent a portion of computing system 202 in FIG. 2, computing system 710 in FIG. 7, and/or portions of exemplary network architecture 800 in FIG. 8. Alternatively, parent volume 120 in FIG. 1 may represent one or more physically separate devices capable of being accessed by a computing device, such as storage array 206 in FIG. 2, computing system 710 in FIG. 7, and/or portions of exemplary network architecture 800 in FIG. 8. In some embodiments, parent volume 120 may include data subject to a space-saving snapshot.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

Figure 2:
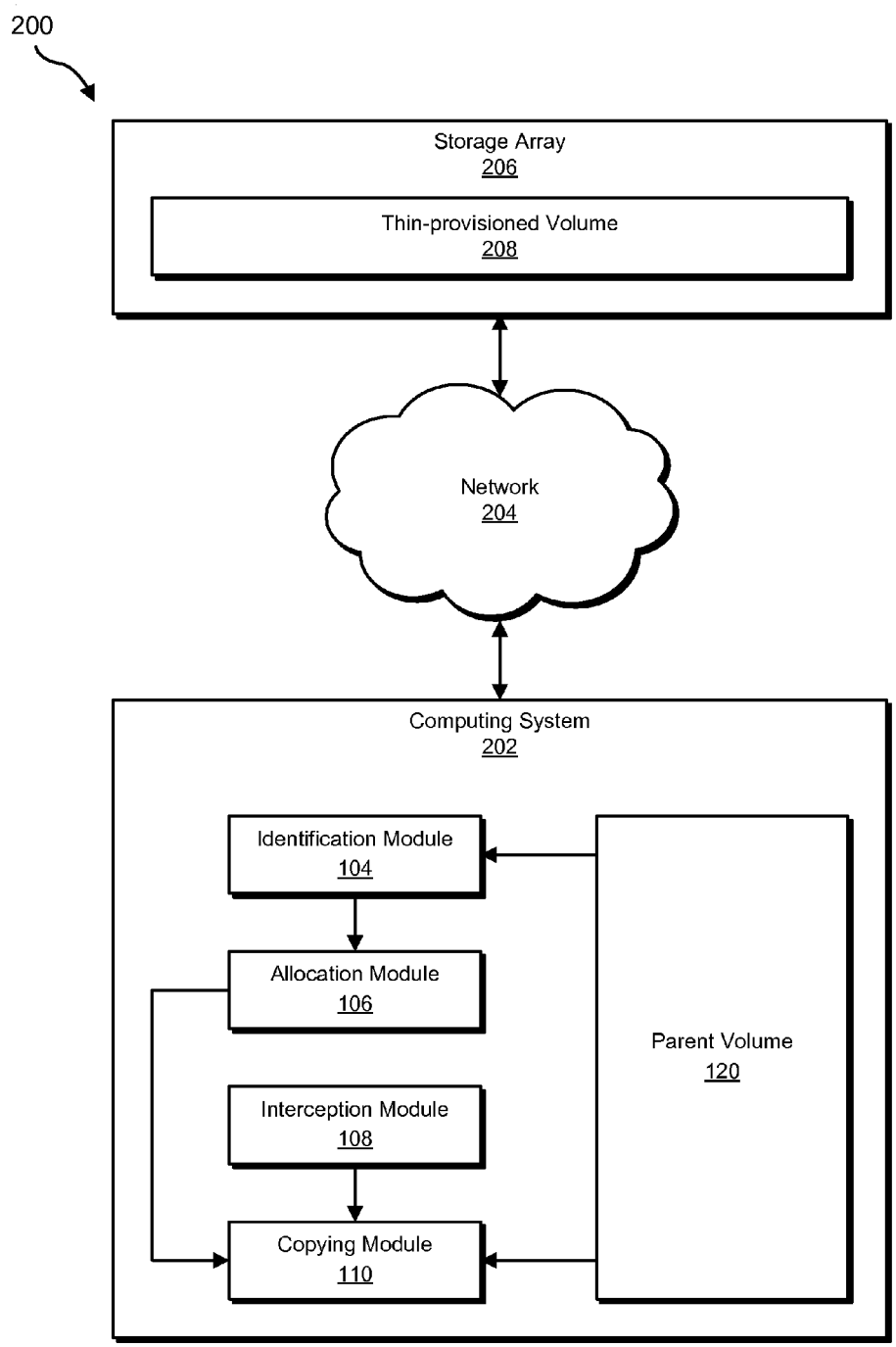
FIG. 2 is a block diagram of an additional exemplary system for creating space-saving snapshots.

As shown in FIG. 2, system 200 may include a computing system 202 in communication with a storage array 206 via a network 204. In one embodiment, and as will be described in greater detail below, modules 102 from FIG. 1 may cause computing system 202 to: 1) identify a parent volume (such as parent volume 120) on which to perform a snapshot, 2) allocate at least one thin-provisioned volume (such as a thin-provisioned volume 208) for the snapshot, 3) identify an attempt to write to a region of the parent volume, and then 4) copy the region to the thin-provisioned volume.

Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 710 in FIG. 7, or any other suitable computing device.

Storage array 206 generally represents any type or form of computing device that is capable of provisioning a thin-provisioned volume. Examples of storage array 206 include, without limitation, an array of hard disk drives, a virtualized storage array, primary storage device 732, and/or backup storage device 733 in FIG. 7.

Network 204 generally represents any medium or architecture capable of facilitating communication or data transfer. Examples of network 204 include, without limitation, an intranet, a wide area network (WAN), a local area network (LAN), a storage area network (SAN), a personal area network (PAN), the Internet, power line communications (PLC), a cellular network (e.g., a GSM Network), exemplary network architecture 800 in FIG. 8, or the like. Network 204 may facilitate communication or data transfer using wireless or wired connections. In one embodiment, network 204 may facilitate communication between computing system 202 and storage array 206.

Figure 3:
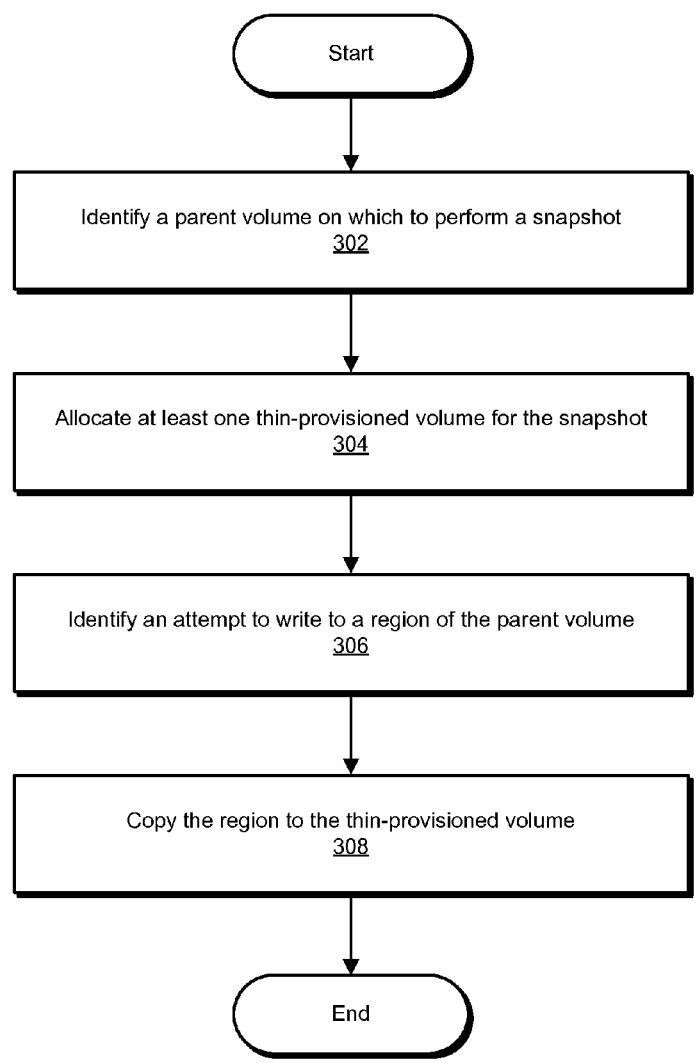
FIG. 3 is a flow diagram of an exemplary method for creating space-saving snapshots.
Figure 4:
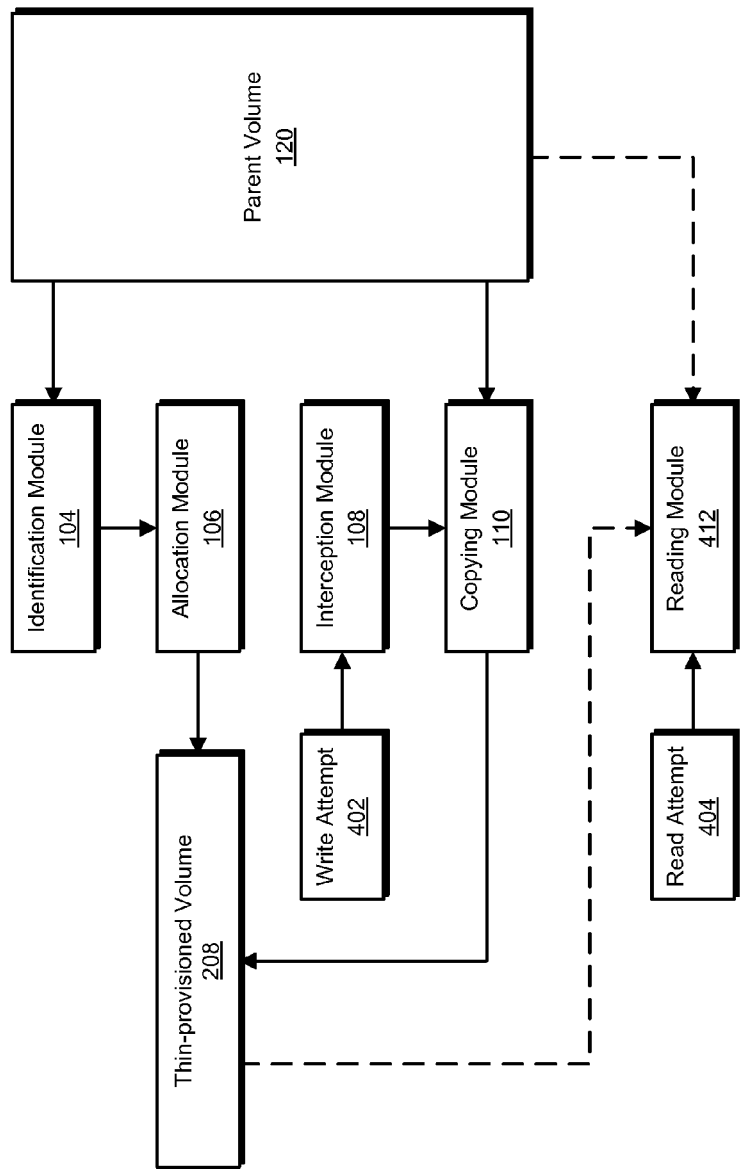
FIG. 4 is a block diagram of an additional exemplary system for creating space-saving snapshots.

FIG. 3 is a flow diagram of an exemplary computer-implemented method 300 for creating space-saving snapshots. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a parent volume on which to perform a snapshot. For example, at step 302 identification module 104 from FIG. 1 may, as part of computing system 202 in FIG. 2, identify parent volume 120. As used herein, the term "volume" may refer to any collection of data and/or logical unit of data and/or storage. Additionally, the term "snapshot" may refer to any representation of a volume and/or a portion of a volume in a certain state and/or point in time. In some examples, a "snapshot" may refer to a space-saving snapshot (e.g., a snapshot that references a parent volume for unchanged data).

Identification module 104 may perform step 302 in a variety of contexts. For example, a backup system may target the parent volume for backup. In this example, the backup system may first create a snapshot of the parent volume to provide a consistent image for the snapshot.

Identification module 104 may identify the parent volume in any suitable manner. For example, identification module 104 may receive a message identifying the parent volume (e.g., from a backup system, from a volume manager, etc.). Additionally or alternatively, identification module 104 may read a configuration file that identifies the parent volume.

At step 304, one or more of the systems described herein may allocate at least one thin-provisioned volume for the snapshot. For example, at step 304 allocation module 106 from FIG. 1 may, as part of computing system 202 in FIG. 2, allocate thin-provisioned module 208 (e.g., from storage array 206) for the snapshot. As used herein, the term "thin-provisioned volume" may refer to any volume, logical disk, and/or logical storage unit for which storage space (e.g., from a physical storage device or array of devices) is allocated on an as-needed or just-in-time basis. In some embodiments, a thin-provisioned volume may represent more storage space than is allocated for the thin-provisioned volume (e.g., the thin-provisioned volume may represent storage space equal to the size of the parent volume).

Allocation module 106 may perform step 304 in any suitable manner. For example, allocation module 106 may allocate the thin-provisioned volume by requesting the thin-provisioned volume from a storage array. Additionally or alternatively, allocation module 106 may allocate the thin-provisioned volume by requesting the thin-provisioned volume from a volume manager (such as VERITAS VOLUME MANAGER). As will be described in greater detail below, allocation module 106 may also allocate a thin-provisioned volume that is equivalent to the size of the parent volume (e.g., if the parent volume is 1 terabyte, allocation module 106 may allocate a thin-provisioned volume of 1 terabyte).

In some examples, allocation module 106 may allocate the thin-provisioned volume from multiple storage arrays. Additionally or alternatively, allocation module 106 may allocate multiple thin-provisioned volumes. For example, the parent volume may be 10 terabytes and a storage array may provide thin-provisioned volumes up to 1 terabyte in size. In this example, allocation module 106 may allocate ten thin-provisioned volumes from the storage array, with each thin-provisioned volume representing 1 terabyte of storage. As will be explained in greater detail below, the parent volume may be isomorphic with respect to the address space of the thin-provisioned volumes allocated for the snapshot of the parent volume. Accordingly, in the above example allocation module 106 may linearly aggregate the ten thin-provisioned volumes and statically map the parent volume to aggregated thin-provisioned volumes.

In some embodiments, allocation module 106 may selectively allocate the thin-provisioned volume. For example, allocation module 106 may select a storage tier and then allocate the thin-provisioned volume from the storage tier. As used herein, the term "storage tier" may refer to any classification, categorization, and/or arrangement of storage. For example, a collection of storage arrays may be arranged into tiers according to a required level of service. Storage tiers may depend on attributes of storage arrays and/or logical units provided by storage arrays. For example, allocation module 106 may identify a storage tier based on the underlying storage medium (e.g., solid state drive, hard disk drive, etc.), the underlying storage configuration (e.g., striped, mirrored, etc.), or the like.

Allocation module 106 may select a storage tier in a variety of ways. For example, allocation module 106 may select a storage tier by selecting a user-specified storage tier (e.g., a user may configure allocation module 106 to allocate the thin-provisioned volume from a certain storage tier and/or set of tiers). Additionally or alternatively, allocation module 106 may select a low storage tier (e.g., a storage tier with a low anticipated level of service).

Returning to FIG. 3, at step 306 one or more of the systems described herein may identify an attempt to write to a region of the parent volume. For example, at step 306 interception module 108 from FIG. 1 may, as part of computing system 202 in FIG. 2, identify an attempt to write to a region of parent volume 120. Using FIG. 4 as an additional example, interception module 108 may identify a write attempt 402 for parent volume 120. As used herein, the term "region" may refer to any unit of storage.

Interception module 108 may perform step 306 in a variety of contexts. For example, interception module 108 may include a portion of a file system filter driver. Accordingly, interception module 108 may observe and identify attempts to write to the parent volume. Additionally or alternatively, interception module 108 may receive a message from a file system filter driver identifying the attempt to write to the region.

The write attempt may include a variety of operations. For example, the write attempt may include an attempt to modify the region on the parent volume. Additionally or alternatively, the write attempt may include an attempt to delete the region on the parent volume.

Returning to FIG. 3, at step 308 one or more of the systems described herein may copy the region to the thin-provisioned volume. For example, at step 308 copying module 110 from FIG. 1 may, as part of computing system 202 in FIG. 2, copy the region to thin-provisioned volume 208. Using FIG. 4 as an additional example, copying module 110 may copy the region affected by write attempt 402 to thin-provisioned module 208.

Copying module 110 may perform step 308 in any suitable manner. For example, copying module 110 may copy the region to the thin-provisioned volume by copying the region to an equivalent address on the thin-provisioned volume. As used herein, the term "equivalent address" may refer to any address, location, and/or designation (such as a logical block address) that corresponds to another address (e.g., is uniformly derivable by a function, such as a bijective mapping function).

Figure 5:
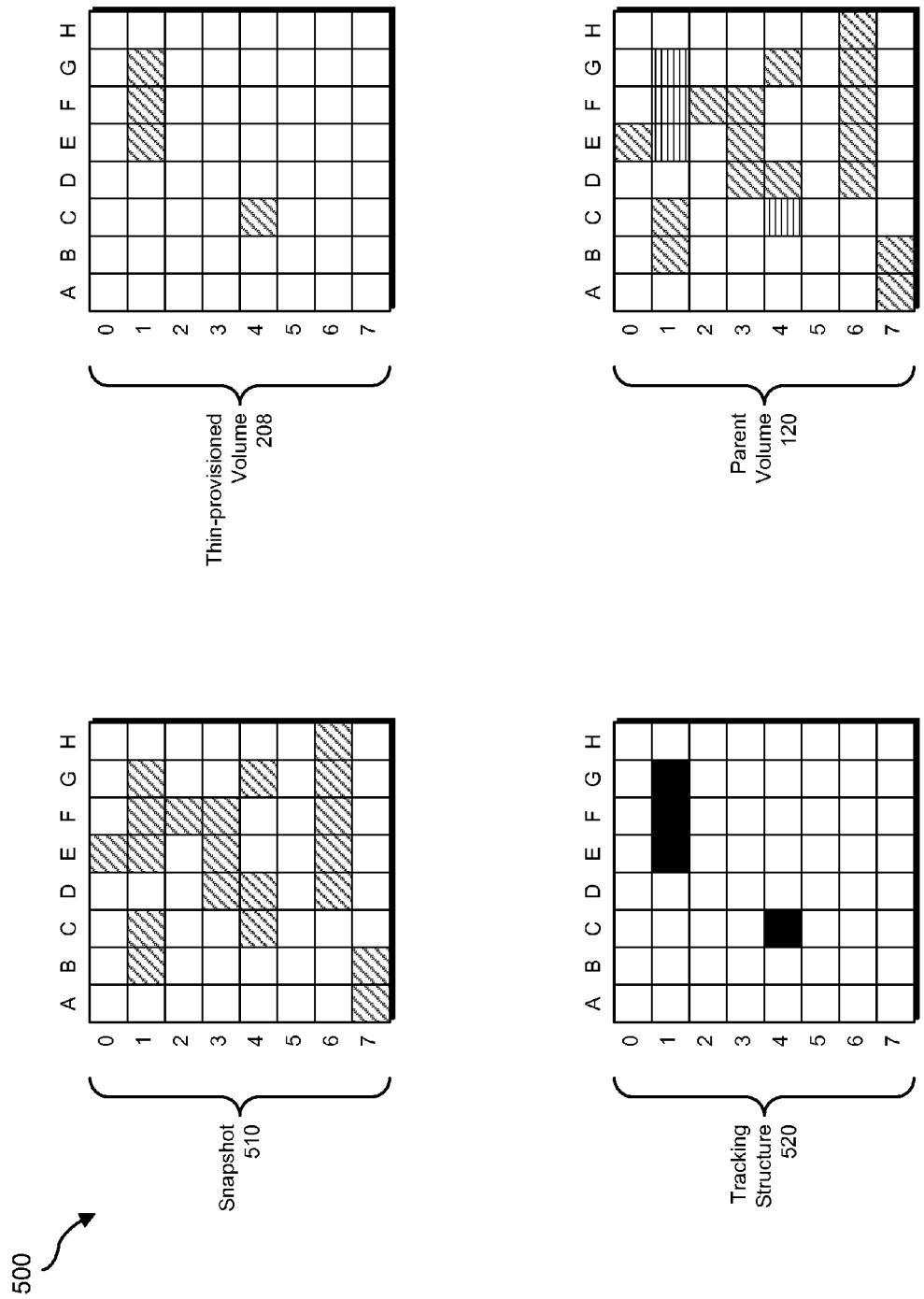
FIG. 5 is a block diagram of an exemplary procedure for creating space-saving snapshots.

For illustrative purposes and by way of example only, FIG. 5 illustrates an exemplary system 500 including parent volume 120 and thin-provisioned volume 208. Parent volume 120 may include 64 regions of storage (A0-H7). Thin-provisioned volume 208 may also represent 64 regions of storage. In this example, when copying module 110 copies a region from parent volume 120 to thin-provisioned volume 208, copying module 110 may copy the region to an equivalent region. For example, copying module 110 may copy region C4 from parent volume 120 to a corresponding region C4 on thin-provisioned volume 208. Thin-provisioned volume 208 may accordingly allocate storage space for C4 (e.g., from a storage array, such as storage array 206 in FIG. 2).

By copying to an equivalent address on thin-provisioned volume 208, the systems and methods described herein may eliminate the need to maintain a map of the locations of copied snapshot data. As will be explained in greater detail below, a future read attempt on region C4 of the snapshot may simply read from region C4 of the thin-provisioned volume rather than referring to a separately-maintained map locating the region. This may be possible because the logical address space of the parent volume and the thin-provisioned volume may be isomorphic. In some embodiments, the block allocation size of the thin-provisioned volume may equal the block size of the snapshot mechanism in order to provide this isomorphism.

Returning to step 308 of FIG. 3, when writing to a previously unallocated region of the thin-provisioned volume, the thin-provisioned volume may normally need to allocate the region from a storage source (such as a storage array) before the writing may commence. Accordingly, in some embodiments the systems and methods described herein may pre-allocate space for the region on the thin-provisioned volume before copying the region to the thin-provisioned volume (e.g., in order to expedite the copying operation). For example, copying module 110 from FIG. 1 may pre-allocate space for the region before reading the region from the parent volume (i.e., in order to copy the region).

Copying module 110 may pre-allocate space for the region in any suitable manner. For example, copying module 110 may send a request through an interface for the thin-provisioned volume to pre-allocate space for the region (e.g., copying module 110 may instruct the thin-provisioned volume to allocate space for the region without writing to the region). Additionally or alternatively, copying module 110 may issue a dummy write attempt to an address of the thin-provisioned volume that is equivalent to an address of the region. For example, copying module 110 may write a block of zero characters (or any other temporary and/or irrelevant data) to the address of the thin-provisioned volume that is equivalent to the address of the region on the parent volume. Upon completion of step 308, exemplary method 300 in FIG. 3 may terminate.

Figure 6:
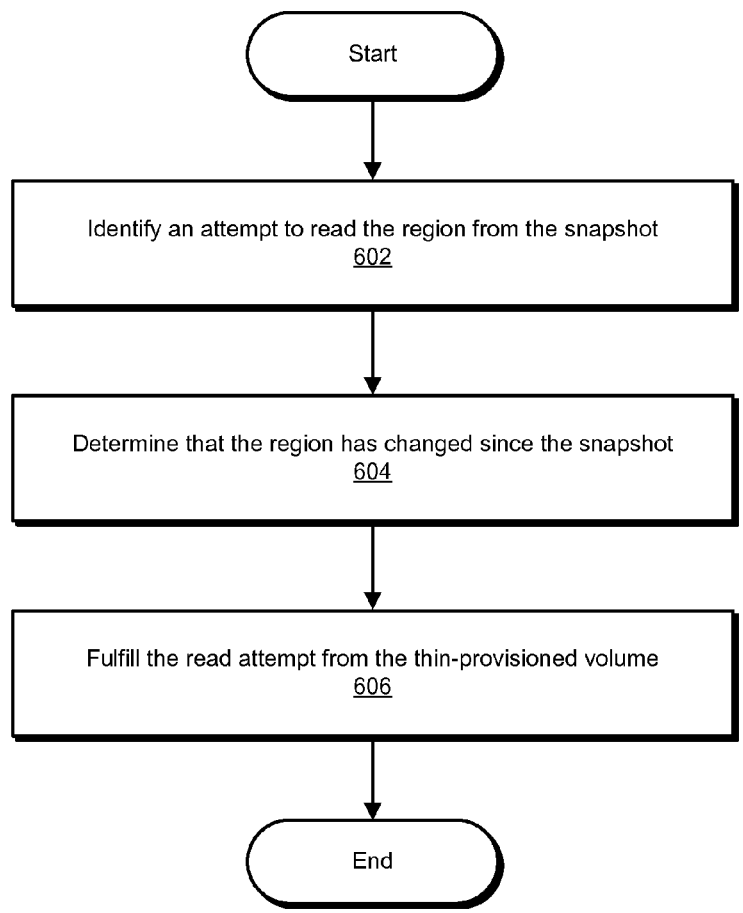
FIG. 6 is a flow diagram of an additional exemplary method for creating space-saving snapshots.

FIG. 6 is a flow diagram of an exemplary computer-implemented method 600 for creating space-saving snapshots. The steps shown in FIG. 6 may be performed by any suitable computer-executable code and/or computing system. In some embodiments, the steps shown in FIG. 6 may be performed by one or more of the components of system 100 in FIG. 1 and/or system 200 in FIG. 2.

As illustrated in FIG. 6, at step 602 one or more of the systems described herein may identify an attempt to read the region from the snapshot. For example, at step 602 a reading module 412 in FIG. 4 may, as part of exemplary system 400, identify a read attempt 404.

Reading module 412 may perform step 602 in a variety of contexts. For example, reading module 602 may include a portion of a volume manager. Accordingly, reading module 602 may observe and identify attempts to read from the snapshot. Additionally or alternatively, interception module 108 may receive a message from a volume manager identifying the attempt to read the region from the snapshot.

At step 604, one or more of the systems described herein may determine that the region has changed since the snapshot. For example, at step 604 reading module 412 in FIG. 4 may, as part of exemplary system 400, determine that the region targeted by read attempt 404 has changed since the snapshot.

Reading module 412 may perform step 604 in a variety of ways. For example, reading module 412 may: 1) mark the region as changed in a tracking structure after copying the region to the thin-provisioned volume and later 2) check the tracking structure to determine that the region has changed. As used herein, the term "tracking structure" may refer to any data structure and/or collection of data that may indicate whether a region has changed. Examples of a tracking structure include, but are not limited to, a bitmap, a sequential log, and an indexed logmap. In some embodiments, reading module 412 may mark the region after the copying operation has commenced. In other embodiments, reading module 412 may mark the region after receiving information indicating that the region is to be copied.

Using FIG. 5 as an example, exemplary system 500 illustrates a snapshot 510 and a tracking structure 520. Snapshot 510 may illustrate the state of parent volume 120 at the time of the snapshot. Subsequent to the snapshot, regions E1, F1, G1, and C4 may be overwritten on parent volume 120. Accordingly, in order to preserve the snapshot, copying module 110 may copy those regions to thin-provisioned volume 208. As each region is copied, copying module 110 and/or reading module 412 may mark the region in tracking structure 520. Reading module 412 may later identify a request to read region F1 from the snapshot. Reading module 412 may accordingly check tracking structure 520 and determine that region F1 has changed since snapshot 510 was created.

Returning to step 604 of FIG. 6, in another example reading module 412 may determine that the region has changed since the snapshot by determining that space for the region has been allocated to the thin-provisioned volume. For example, reading module 412 may access and read metadata associated with the thin-provisioned volume to determine that the region has been allocated to the thin-provisioned volume. Additionally or alternatively, reading module 412 may query the thin-provisioned volume via an interface to determine that the region has been allocated to the thin-provisioned volume.

In one example, reading module 412 may determine that the region has been allocated to the thin-provisioned volume by determining that space for an address of the thin-provisioned volume that is equivalent to an address for the region has been allocated. Using FIG. 5 as an example, if reading module 412 has identified an attempt to read from region G1 of snapshot 510, reading module 412 may determine that a corresponding region has been allocated to thin-provisioned volume 208 by determining that region G1 of thin-provisioned volume 208 has been allocated. Since a region on the thin-provisioned volume may be allocated when a region of the parent volume is overwritten after the snapshot, the allocation pattern on thin-provisioned volume 208 may be identical to what a tracking structure as described earlier may show.

Returning to FIG. 6, at step 606 one or more of the systems described herein may fulfill the read attempt from the thin-provisioned volume. For example, at step 606 reading module 412 in FIG. 4 may, as part of exemplary system 400, fulfill read attempt 404 from thin-provisioned volume 208.

Reading module 412 may perform step 606 in any suitable manner. For example, reading module 412 may simply use the same logical block address specified in the read attempt to read from the thin-provisioned volume. In some examples, reading module 412 may apply a function to the logical block address of the read attempt before reading from the volume. For example, if multiple thin-provisioned volumes were allocated for the snapshot, reading module 412 may determine which thin-provisioned volume the read attempt maps to and offset the logical block address by the size of each thin-provisioned volume multiplied by the number of the thin-provisioned volume. Additionally or alternatively, reading module 412 may look up the correct address on the thin-provisioned volume using a static map (e.g., a look-up table that converts an address of the parent volume to an address of the thin-provisioned volume).

In some examples, reading module 412 may fulfill a read attempt from the parent volume. For example, reading module 412 may: 1) identify an attempt to read the region from the snapshot, 2) determine that the region has not changed since the snapshot, and then 3) fulfill the read attempt from the parent volume. As detailed above, reading module 412 may identify the attempt to read the region in any suitable manner. Likewise, reading module 412 may use the methods described above to determine that the region has not changed since the snapshot. Upon completion of step 606, exemplary method 600 in FIG. 6 may terminate.

The systems and methods described herein may be used in a variety of ways and a variety of contexts. For example, the systems and methods described herein may enable restoration of a primary volume from a thin-provisioned volume with immediate concurrent access to the primary volume (e.g., while data from the thin-provisioned volume is copied to the primary volume, reads may be performed via the snapshot). The systems and methods described herein may also be used to create chain-structured snapshots and/or tree-structured snapshots.

As detailed above, by storing blocks of data copied for space-saving snapshots on thin-provisioned volumes, the systems and methods described herein may statically map the location of the snapshot blocks between their original location on a parent volume and a thin-provisioned volume. As such, the systems and methods described herein may reduce the I/O load on a system that may otherwise maintain persistent dynamic snapshot block location maps. Additionally, if a cluster of systems require access to the snapshot, the systems and methods described herein may eliminate the need to synchronize a snapshot block location map across various nodes within the cluster, potentially reducing I/O latency and/or network traffic.

Figure 7:
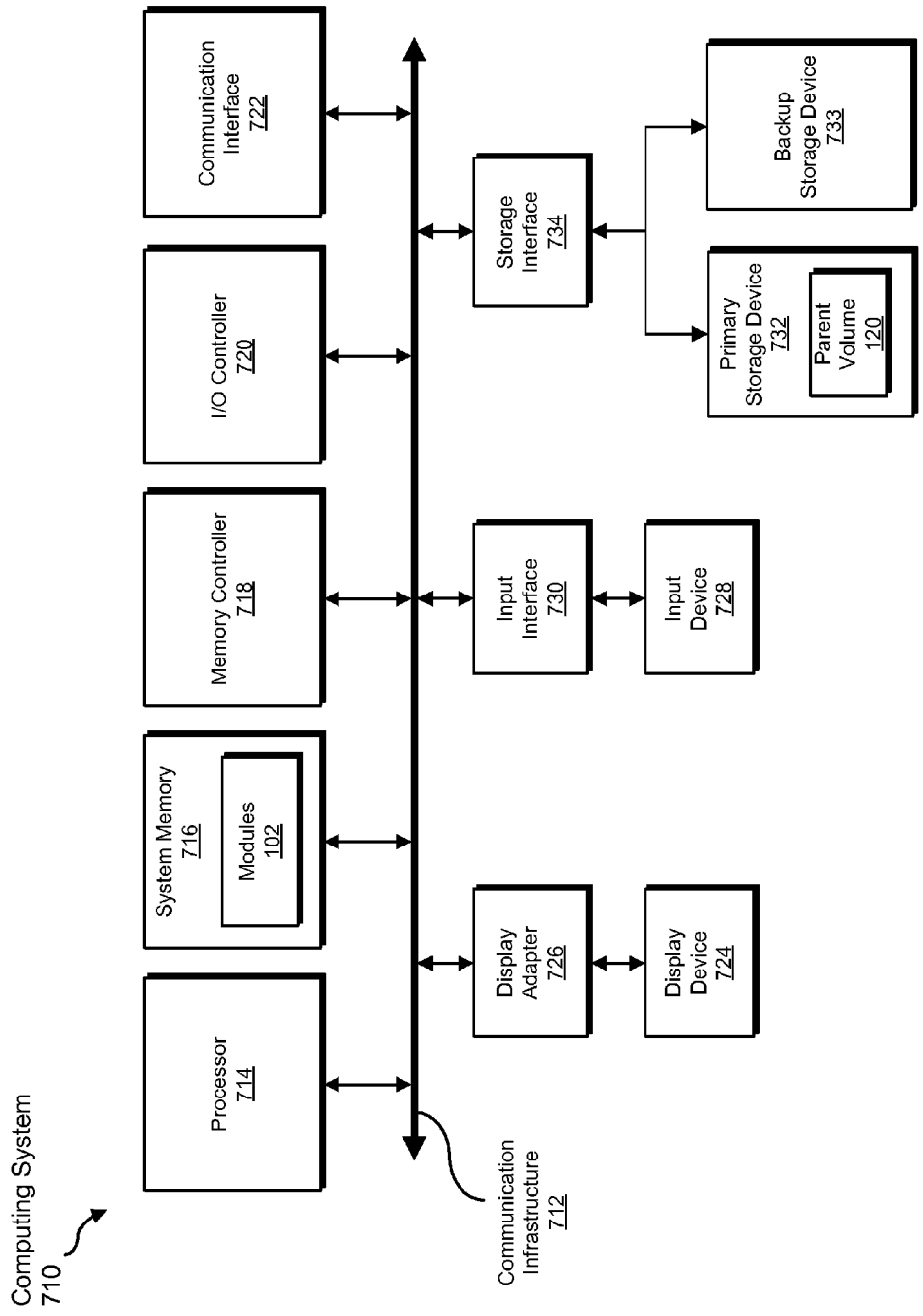
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the identifying, allocating, selecting, copying, pre-allocating, sending, issuing, determining, marking, checking, and/or fulfilling steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an input/output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller 718 may perform and/or be a means for performing, either alone or in combination with other elements, one or more of the steps or features described and/or illustrated herein, such as identifying, allocating, selecting, copying, pre-allocating, sending, issuing, determining, marking, checking, and/or fulfilling.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing, either alone or in combination with other elements, one or more of the identifying, allocating, selecting, copying, pre-allocating, sending, issuing, determining, marking, checking, and/or fulfilling steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the identifying, allocating, selecting, copying, pre-allocating, sending, issuing, determining, marking, checking, and/or fulfilling steps disclosed herein. Communication interface 722 may also be used to perform and/or be a means for performing other steps and features set forth in the instant disclosure.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the identifying, allocating, selecting, copying, pre-allocating, sending, issuing, determining, marking, checking, and/or fulfilling steps disclosed herein. Input device 728 may also be used to perform and/or be a means for performing other steps and features set forth in the instant disclosure.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710. In one example, parent volume 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, storage devices 732 and 733 may be used, for example, to perform and/or be a means for performing, either alone or in combination with other elements, one or more of the identifying, allocating, selecting, copying, pre-allocating, sending, issuing, determining, marking, checking, and/or fulfilling steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
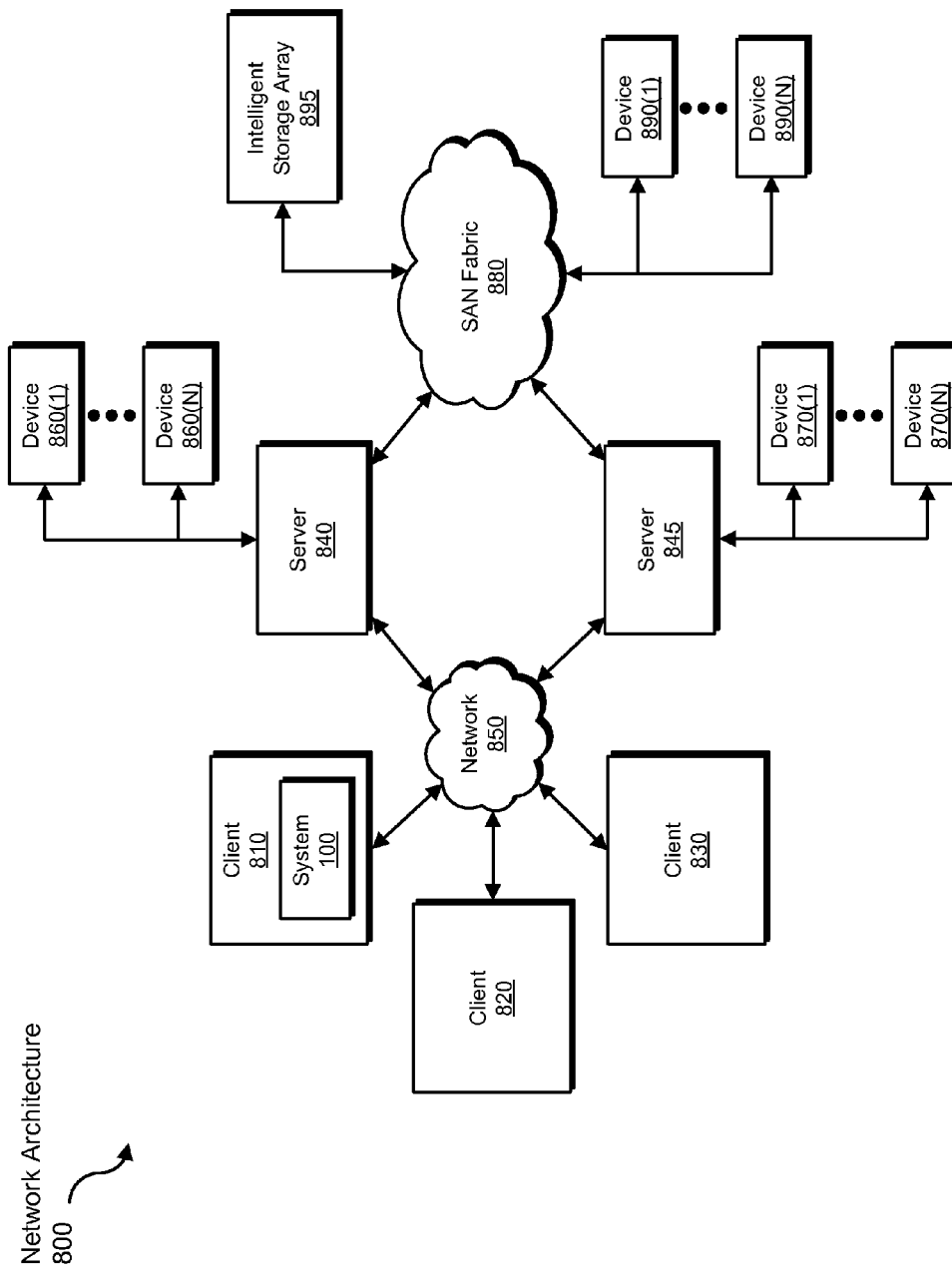
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. In one example, client system 810 may include system 100 from FIG. 1.

Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the identifying, allocating, selecting, copying, pre-allocating, sending, issuing, determining, marking, checking, and/or fulfilling steps disclosed herein. Network architecture 800 may also be used to perform and/or be a means for performing other steps and features set forth in the instant disclosure.

As detailed above, computing system 710 and/or one or more components of network architecture 800 may perform and/or be a means for performing, either alone or in combination with other elements, one or more steps of an exemplary method for creating space-saving snapshots.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a thin-provisioned volume into an efficient mechanism for providing space-saving snapshots.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for creating space-saving snapshots, at least a portion of the method being performed by a computing device comprising at least one processor, the method comprising:
    identifying a parent volume on which to perform a snapshot;
    allocating at least one thin-provisioned volume for the snapshot, wherein the thin-provisioned volume logically presents more storage space than is physically allocated to the thin-provisioned volume;
    identifying an attempt to write to a region of the parent volume;
    copying the region to a logical address on the thin-provisioned volume that is equivalent to the region's logical address on the parent volume without maintaining a dynamic map between the parent volume and the thin-provisioned volume that identifies the logical address of the copied region on the thin-provisioned volume;
    wherein the logical address space of the parent volume and the logical address space of the thin-provisioned volume are isomorphic.

2. The computer-implemented method of claim 1, further comprising:
    identifying an attempt to read the region from the snapshot;
    determining that the region has changed since the snapshot;
    fulfilling the read attempt from the thin-provisioned volume.

3. The computer-implemented method of claim 2, wherein determining that the region has changed since the snapshot comprises:
    marking the region as changed in a tracking structure after copying the region to the thin-provisioned volume;
    checking the tracking structure to determine that the region has changed.

4. The computer-implemented method of claim 2, wherein determining that the region has changed since the snapshot comprises determining that space for the region has been allocated to the thin-provisioned volume.

5. The computer-implemented method of claim 4, wherein determining that space for the region has been allocated to the thin-provisioned volume comprises determining that space for the logical address on the thin-provisioned volume that is equivalent to the region's logical address on the parent volume has been allocated.

6. The computer-implemented method of claim 1, further comprising:
    identifying an attempt to read the region from the snapshot;
    determining that the region has not changed since the snapshot;
    fulfilling the read attempt from the parent volume.

7. The computer-implemented method of claim 1, further comprising pre-allocating space for the region on the thin-provisioned volume before copying the region to the thin-provisioned volume.

8. The computer-implemented method of claim 7, wherein pre-allocating space for the region on the thin-provisioned volume comprises sending a request through an interface for the thin-provisioned volume to pre-allocate space for the region.

9. The computer-implemented method of claim 7, wherein pre-allocating space for the region on the thin-provisioned volume comprises issuing a dummy write attempt to the logical address on the thin-provisioned volume that is equivalent to the region's logical address on the parent volume.

10. The computer-implemented method of claim 1, wherein allocating the thin-provisioned volume for the snapshot comprises:
    selecting a storage tier;
    allocating the thin-provisioned volume from the storage tier.

11. The computer-implemented method of claim 10, wherein selecting the storage tier comprises selecting a low storage tier.

12. The computer-implemented method of claim 10, wherein selecting the storage tier comprises selecting a user-specified storage tier.

13. A system for creating space-saving snapshots, the system comprising:
    an identification module programmed to identify a parent volume on which to perform a snapshot;
    an allocation module programmed to allocate at least one thin-provisioned volume for the snapshot, wherein the thin-provisioned volume logically presents more storage space than is physically allocated to the thin-provisioned volume;
    an interception module programmed to identify an attempt to write to a region of the parent volume;
    a copying module programmed to copy the region to a logical address on the thin-provisioned volume that is equivalent to the region's logical address on the parent volume without maintaining a dynamic map between the parent volume and the thin-provisioned volume that identifies the logical address of the copied region on the thin-provisioned volume;
    wherein the logical address space of the parent volume and the logical address space of the thin-provisioned volume are isomorphic;
    at least one processor configured to execute the identification module, the allocation module, the interception module, and the copying module.

14. The system of claim 13, further comprising a reading module programmed to:
    identify an attempt to read the region from the snapshot;
    determine that the region has changed since the snapshot;
    fulfill the read attempt from the thin-provisioned volume.

15. The system of claim 14, wherein the reading module is programmed to determine that the region has changed since the snapshot by:
    marking the region as changed in a tracking structure after copying the region to the thin-provisioned volume;
    checking the tracking structure to determine that the region has changed.

16. The system of claim 14, wherein the reading module is programmed to determine that the region has changed since the snapshot by determining that space for the region has been allocated to the thin-provisioned volume.

17. The system of claim 16, wherein the reading module is programmed to determine that space for the region has been allocated to the thin-provisioned volume by determining that space for the logical address on the thin-provisioned volume that is equivalent to the region's logical address on the parent volume has been allocated.

18. A non-transitory computer-readable-storage medium comprising computer-executable instructions that, when executed by at least one processor of a computing device, cause the computing device to:
- identify a parent volume on which to perform a snapshot;
- allocate at least one thin-provisioned volume for the snapshot, wherein the thin-provisioned volume logically presents more storage space than is physically allocated to the thin-provisioned volume;
- identify an attempt to write to a region of the parent volume;
- copy the region to a logical address on the thin-provisioned volume that is equivalent to the region's logical address on the parent volume without maintaining a dynamic map between the parent volume and the thin-provisioned volume that identifies the logical address of the copied region on the thin-provisioned volume;
- wherein the logical address space of the parent volume and the logical address space of the thin-provisioned volume are isomorphic.

* * * * *